Patented June 21, 1938

2,121,551

UNITED STATES PATENT OFFICE 2,121,551

PREPARATION OF DINITRILES

George Wayne Rigby, Wilmington, Del., assignor to E. I. du Pont de Nemours & Company, Wilmington, Del., a corporation of Delaware No Drawing. Application December 2, 1936, Serial No. 113,833

25 Claims. (Cl. 260—99.30)

This invention relates to a method of preparing aliphatic dinitriles containing at least 3 carbon atoms, and more particularly to a method of preparing such aliphatic dinitriles from the diamides of aliphatic dicarboxylic acids containing at least 3 carbon atoms.

It is well known that aliphatic diamides may be dehydrated by means of phosphorous halides to obtain the corresponding nitriles. Moreover, the use of dehydrating agents, such as the phosphorous halides, introduces a problem of handling corrosive chemicals. The use of these compounds makes it necessary that the reaction vessels be constructed of materials resistant to the action of hydrogen chloride. This is both troublesome and expensive and such processes therefore are not adaptable for commercial use.

This invention has as its object the preparation of aliphatic dinitriles having at least three carbon atoms and as a further object the preparation of dinitriles having at least six carbon atoms. A still further object is the preparation by a convenient method of aliphatic dinitriles from the corresponding diamides. Other objects will appear hereinafter.

These objects are accomplished by the following invention which comprises treating a diamide of an aliphatic dicarboxylic acid having at least three carbon atoms with an anhydride of an organic acid and thereafter separating the products. In the preferred embodiment of this invention the diamide of the aliphatic dicarboxylic acid containing at least three carbon atoms is treated with a volatile anhydride of an aliphatic monocarboxylic acid to form a complex intermediate product which is thereafter decomposed by heating to give the dinitrile.

The following examples set forth instances of the application of this invention. They are not to be considered as limitations of the invention since many modifications may be made without departing from the spirit and scope thereof.

Example I

Ten parts of adipamide (prepared by reacting adipic acid with slightly more than a molecular equivalent of urea) were placed in a suitable vessel provided with an inlet tube, and an exit tube connected to a condensing apparatus. The temperature of the apparatus was then raised to 250° C. and a rapid stream of ketene (generated in known manner by the pyrolysis of acetone) passed through the vessel. The reaction was rapid and in 2 hours the theoretical amount of acetic acid was collected as distillate. The reaction mixture was then distilled under 5 mm. pressure and the product B. P. 135° C. collected. The yield of adiponitrile amounted to 5 parts or 71.5% of the theoretical quantity.

Example II

Sebacic acid diamide was prepared in a known manner by heating sebacic acid with aqueous ammonia. The purified diamide had a M. P. of 202° C. A vessel similar to that used in Example I was charged with 14.8 parts of this sebacamide and the temperature raised to 230° C. A rapid stream of ketene was then passed into the vessel during four hours. At the end of this time, the theoretical quantity of acetic acid had been collected as distillate. The mixture was then subjected to vacuum distillation and the sebaconitrile, B. P. 157° C. to 158° C. at 3 mm. collected. The yield was 7.7 parts or 63.6% of the theoretical amount.

Example III

Seventy-two and two-tenths (72.2) parts of crude adipamide (prepared by heating together 73 parts of adipic acid with 33 parts of urea until the melt solidified at 210° to 215° C.) and 110 parts of commercial acetic anhydride were placed in a suitable vessel connected to a seven transfer unit column. The mixture was heated (the bath was at 200° C.) under total reflux until the amide had dissolved. This required about one hour. The liberated acetic acid was then allowed to distill off and the heating continued four hours after the last of the acetic acid had been removed. The mixture was then subjected to vacuum distillation and the product, B. P. 115° C. at 3 mm. collected. The yield of adiponitrile amounted to 44.7 parts or 83% of the theoretical quantity.

In this experiment 0.5 mol. of adipamide was reacted with 1.04 mols of acetic anhydride (the commercial acetic anhydride contained 96.5% acetic anhydride). This quantity of anhydride corresponds quite closely to the equation:

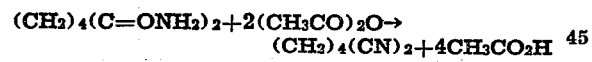

It will be noted that the reaction flask was heated in a bath at approximately 200° C. and that pyrolysis of the intermediate compound was continued 4 hours. This was found necessary in order to increase the yield of nitrile.

Example IV

One hundred and forty-four (144) parts of adipamide, M. P. 215° to 217° C., were mixed in a suitable vessel with 306 parts of commercial acetic anhydride (containing 96.5% anhydride). The mixture was refluxed gently for 16 hours; then the acetic acid and excess acetic anhydride were distilled off at atmospheric pressure. The mixture was then subjected to vacuum distillation and the product, B. P. 140° C. at 5 mm. collected. The yield was 81.7 parts or 75.7% of the theoretical.

*Example V*

One hundred parts of fumaric acid diamide (prepared by the action of aqueous ammonia on dimethyl fumarate) were mixed with 250 parts of acetic anhydride and the mixture refluxed until the diamide had dissolved. Acetic acid was then distilled off and the mixture heated 4 hours at 200°. Fumaronitrile, M. P. 95° C., may be isolated by vacuum distillation of the crude reaction mixture or by recrystallization from methanol.

In accordance with the foregoing examples it is seen that in the preferred embodiment of this invention an anhydride of a lower aliphatic acid, such as acetic acid, is reacted with a diamide of a dicarboxylic acid, such as adipamide at a temperature such as 250° C. to give the corresponding aliphatic acid and the dinitrile corresponding to the diamide used. The aliphatic acid may be removed as it is formed. At the completion of the reaction, the dinitrile may be isolated by vacuum distillation directly from the crude reaction mixture.

By an anhydride is meant a dehydration product of an organic acid which is capable of reacting with the elements of water to yield the acid from which the anhydride may be considered as being derived. This includes both the monomeric and dimeric anhydrides—the monomeric anhydrides being typified by ketene and the dimeric anhydrides being typified by acetic anhydride. Ketene may be prepared by passing acetic acid through a tube heated at 800° C. (page 344 in C. D. Hurd's "The Pyrolysis of Carbon Compounds") and since ketene reacts with water to form acetic acid, it may properly be considered as a monomeric anhydride thereof. Acetic anhydride, in a similar manner, is derived from acetic acid by eliminating the elements of water from two acetic acid molecules. The reverse of this reaction, namely the addition of water to acetic anhydride to form acetic acid, is well known.

Volatile anhydrides of aliphatic acids which may be used include acetic, propionic, butyric, isobutyric, valeric, iso-valeric, trimethyl acetic, and caproic anhydrides. Also anhydrides of the type of succinic, adipic, sebacic, -methyl adipic, glutaric, and pimelic may be used. Other aliphatic anhydrides of the type of ketene, methyl ketene, ethyl ketene, propyl ketene and butyl ketene are suitable for carrying out this invention.

Ketene and acetic anhydride are the preferred reagents for use in the practice of this invention because of their availability and relatively low cost. Furthermore, acetic anhydride has a relatively high vapor pressure, is easily removed from the reaction mixture, and is readily available at low cost.

Any of the ordinary diamides of aliphatic dicarboxylic acids may be used in this process. These may include the diamides of succinic, glutaric, pimelic, malonic, suberic, methyl adipic, dimethyl adipic, dodecyl adipic, didodecyl adipic, dodecane dicarboxylic acids, and other acids of this type. The preferred diamides are those of dicarboxylic acids containing at least 6 carbon atoms and in which the carboxyl groups are removed by at least 4 carbon atoms.

The diamides of these dicarboxylic acids may be prepared by any of the known procedures such as by the reaction of the ester with ammonia, the dehydration of the ammonium salt by heat, the reaction of the acid with urea, the reaction of the acid imide with ammonia, or the reaction of the acid halide or anhydride with ammonia. These amides may be isolated previous to the dehydration or may be prepared in the reaction vessel just prior to adding the organic acid anhydride. Moreover, they may be prepared during the dehydration as by treating the ammonium salt of the acid directly with an acid anhydride.

The temperature at which the dehydration takes place may be varied within wide limits. Thus, temperatures of from 150° to 300° C. are operable; the preferred range, however, is from 200° to 250° C. although this varies somewhat with the anhydride used. Thus with ketene a temperature of over 200° C. is necessary for rapid and complete reaction, while with acetic anhydride temperatures as low as 150° C. may be used satisfactorily although, even in this case, a temperature of 200° C. is preferable.

The proportion of anhydride to amide need be only one mol. of anhydride per amide group. Examples III and IV illustrate this point quite clearly. In Example III very nearly the theoretical amount of anhydride was used and a yield of 83% of the theoretical amount of adiponitrile obtained.

Although the apparatus used in the examples consisted of an efficient distillation column, it is possible to separate the nitrile from other reaction products by other means such as solvent extraction followed by washing with dilute alkali to remove the free organic acid.

This invention provides a suitable process for the preparation of aliphatic dinitriles such as adiponitrile in conventional process apparatus available in most chemical manufacturing plants.

This invention involves certain advantages over other dehydrating agents such as phosphorous trichloride, benzotrichloride, phosgene, and p-toluene sulfonyl chloride. With these reagents, the hydrogen chloride evolved during the reaction presents a serious corrosion problem. The present process avoids this difficulty.

Because of the ease of manipulation, simplicity of apparatus and chemicals and the good yield obtained, the present process is well suited for plant operation on any desired scale.

The course of this reaction appears to be represented by the following equations:

(1) 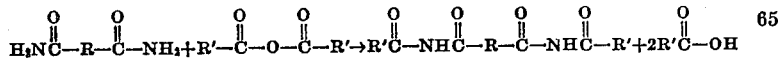

(2) 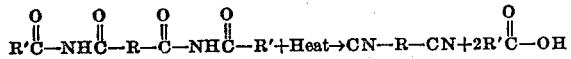

In support of this hypothesis it has been found that solution of the amide in the acid anhydride involves a consumption of acid anhydride which corresponds closely to Equation (1). Moreover, from the reaction mixture of acetic anhydride and adipamide there has been isolated a compound, B. P. 188° to 190° C., which yielded acetic acid and adiponitrile when decomposed by heat. If the crude reaction mixture after removal of the acetic acid by distillation were subjected at once to vacuum distillation there was obtained only about 50% of the theoretical amount of adiponitrile. The residue in the flask then yielded the high boiling product referred to above. If, however, the heating of the flask were continued, either with or without a vacuum, for about 4 hours at 200° C. there was obtained an additional 33% of adiponitrile. The critical reaction, therefore, appears to be represented by Equation (2).

Catalysts, conditions of heating, and apparatus such as stirrers, agitators, etc., which aid in this pyrolysis may, in certain instances, aid in carrying out this invention. Reactions (1) and (2) may be carried out simultaneously as in Example I by carrying out the reaction at a temperature sufficiently high to decompose the acetylated amide as it is formed. On the other hand, the two reactions may be carried out consecutively as in Example III. Either of these conditions of reaction have given good results.

It is apparent that many widely different embodiments of this invention may be made without departing from the spirit and scope thereof and therefore it is not intended to be limited except as indicated in the appended claims.

I claim:

1. The process for the production of aliphatic dinitriles containing at least three carbon atoms, which comprises heating a mixture of a diamide of an aliphatic dicarboxylc acid having at least three carbon atoms and an anhydride of an aliphatic organic acid to a temperature within the range of 150° to 300° C.

2. The process in accordance with claim 1 characterized in that the diamide is adipamide.

3. The process for the production of aliphatic dinitriles containing at least three carbon atoms, which comprises heating a mixture of a diamide of an aliphatic dicarboxylic acid having at least three carbon atoms and an anhydride of a volatile aliphatic monocarboxylic acid to a temperature within the range of 150° to 300° C.

4. The process in accordance with claim 3 characterized in that the reaction is carried out at a temperature between 200° and 250° C.

5. The process in accordance with claim 3 characterized in that the anhydride is acetic anhydride.

6. The process in accordance with claim 3 characterized in that the anhydride is ketene.

7. The process in accordance with claim 3 characterized in that the diamide is adipamide.

8. The process for the production of aliphatic dinitriles containing at least three carbon atoms, which comprises heating at a temperature within the range of 150° to 300° C. a mixture of a diamide of an aliphatic dicarboxylic acid having at least three carbon atoms and an anhydride of a volatile aliphatic monocarboxylic acid until the diamide is dissolved, then distilling off the volatile aliphatic monocarboxylic acid formed by the reaction.

9. The process in accordance with claim 8 characterized in that the diamide is adipamide.

10. The process for the production of an aliphatic dinitrile containing at least three carbon atoms, which comprises heating at a temperature within the range of 150° to 300° C. a mixture of a diamide of an aliphatic dicarboxylic acid having at least three carbon atoms and an anhydride of a volatile aliphatic monocarboxylic acid until the diamide is dissolved, then distilling off the volatile aliphatic monocarboxylic acid formed by the reaction, and continuing the heating of the reaction product for a sufficient length of time to cause any remaining volatile aliphatic monocarboxylic acid to split off from said product.

11. The process in accordance with claim 10 characterized in that the anhydride is acetic anhydride.

12. The process in accordance with claim 10 characterized in that the anhydride is ketene.

13. The process in accordance with claim 10 characterized in that the diamide is adipamide.

14. The process for the production of an aliphatic dinitrile containing at least three carbon atoms, which comprises heating at a temperature within the range of 150° to 300° C. a mixture of a diamide of an aliphatic dicarboxylic acid having at least three carbon atoms and an anhydride of a volatile aliphatic monocarboxylic acid until the diamide is dissolved, then distilling off the volatile aliphatic monocarboxylic acid formed by the reaction, and continuing the heating of the reaction product for a sufficient length of time to cause any remaining volatile aliphatic monocarboxylic acid to split off from said product and removing the monocarboxylic acid from the reaction zone.

15. The process for the production of an aliphatic dinitrile containing at least three carbon atoms, which comprises heating a mixture of a diamide of an aliphatic dicarboxylic acid having at least three carbon atoms and an anhydride of a volatile aliphatic monocarboxylic acid under reflux conditions until the said diamide is dissolved, then distilling off the volatile aliphatic monocarboxylic acid formed.

16. The process in accordance with claim 15 characterized in that the molar ratio of the diamide to the anhydride is about 1:2.

17. The process in accordance with claim 15 characterized in that the anhydride is acetic anhydride and the organic acid distilled off is acetic acid.

18. The process in accordance with claim 15 characterized in that the anhydride is ketene and the organic acid distilled off is acetic acid.

19. The process in accordance with claim 15 characterized in that the diamide is adipamide.

20. The process for the production of an aliphatic dinitrile containing at least three carbon atoms, which comprises heating a mixture of a diamide of an aliphatic dicarboxylic acid having at least three carbon atoms and an anhydride of a volatile aliphatic monocarboxylic acid under reflux conditions until the said diamide is dissolved, then distilling off the volatile aliphatic monocarboxylic acid formed, and continuing the heating of the resulting product for a period of time sufficient to cause all of the volatile aliphatic monocarboxylic acid to split off from said product.

21. The process in accordance with claim 20 characterized in that the reaction is carried out at a temperature between 150° and 300° C. and the heating is conducted for a period of about four hours after the first amount of volatile aliphatic monocarboxylic acid is removed.

22. The process for the production of an aliphatic dinitrile containing at least three carbon atoms, which comprises heating a mixture of a diamide of an aliphatic dicarboxylic acid having at least three carbon atoms and an anhydride of a volatile aliphatic monocarboxylic acid under reflux conditions until the said diamide is dissolved, then distilling off the volatile aliphatic monocarboxylic acid formed, and continuing the heating of the resulting product for a period of time sufficient to cause all of the volatile aliphatic monocarboxylic acid to split off from said product and removing the monocarboxylic acid from the reaction zone.

23. The process for the production of adiponitrile which comprises heating a mixture of adipamide and acetic anhydride under reflux conditions until the said adipamide is dissolved, then distilling off the acetic acid formed.

24. The process for the production of adiponitrile which comprises heating a mixture of adipamide and ketene under reflux conditions until said adipamide is dissolved, then distilling off the acetic acid formed.

25. The process for the production of adiponitrile which comprises heating a mixture of adipamide and acetic anhydride in a molar ratio of about 1:2, under reflux conditions at a temperature of about 200° to about 250° C. until the adipamide is dissolved, then distilling off the acetic acid, continuing the heating for about four hours after the first formed acetic acid is removed, and recovering the adiponitrile formed.

GEORGE WAYNE RIGBY.